United States Patent [19]

Comley

[11] Patent Number: 4,888,973

[45] Date of Patent: Dec. 26, 1989

[54] HEATER FOR SUPERPLASTIC FORMING OF METALS

[75] Inventor: Peter N. Comley, Cerritos, Calif.

[73] Assignee: Murdock, Inc., Compton, Calif.

[21] Appl. No.: 240,595

[22] Filed: Sep. 6, 1988

[51] Int. Cl.$^4$ .................... B21D 37/16; B30B 15/34; B29J 5/08

[52] U.S. Cl. .................................. 72/342; 100/93 P; 219/152; 219/243; 425/406

[58] Field of Search .................. 72/342, 455, 700, 38; 100/93 P; 425/407, 446, 406; 219/149, 152, 154, 243, 245, 457

[56] References Cited

U.S. PATENT DOCUMENTS

| | | | |
|---|---|---|---|
| 2,814,101 | 11/1957 | Prough et al. | 72/342 |
| 3,350,913 | 11/1967 | Bergholdt et al. | 72/700 |
| 3,461,709 | 8/1969 | McMillen | 72/342 |
| 3,754,499 | 8/1973 | Heisman et al. | 425/407 |
| 3,999,917 | 12/1976 | Knowles | 425/407 |
| 4,208,574 | 6/1980 | Schafer | 219/245 |
| 4,352,280 | 10/1982 | Ghosh | 72/342 |
| 4,635,461 | 1/1987 | Raymond | 72/342 |

FOREIGN PATENT DOCUMENTS 664852  6/1963  Canada ................ 219/243

Primary Examiner—Robert L. Spruill
Attorney, Agent, or Firm—George F. Bethel; Patience K. Bethel

[57] ABSTRACT

A superplastic forming machine having ceramic platens which are oriented to each other with heating elements of each platen arranged at a substantially right angle relationship to the heating elements of the other platen. The heating elements are formed as wires in rectangular sections which overlie each other to permit the increased preferable heating of the areas of greatest heat loss, such as the corners and the periphery of a superplastic metal forming heated platen.

17 Claims, 4 Drawing Sheets

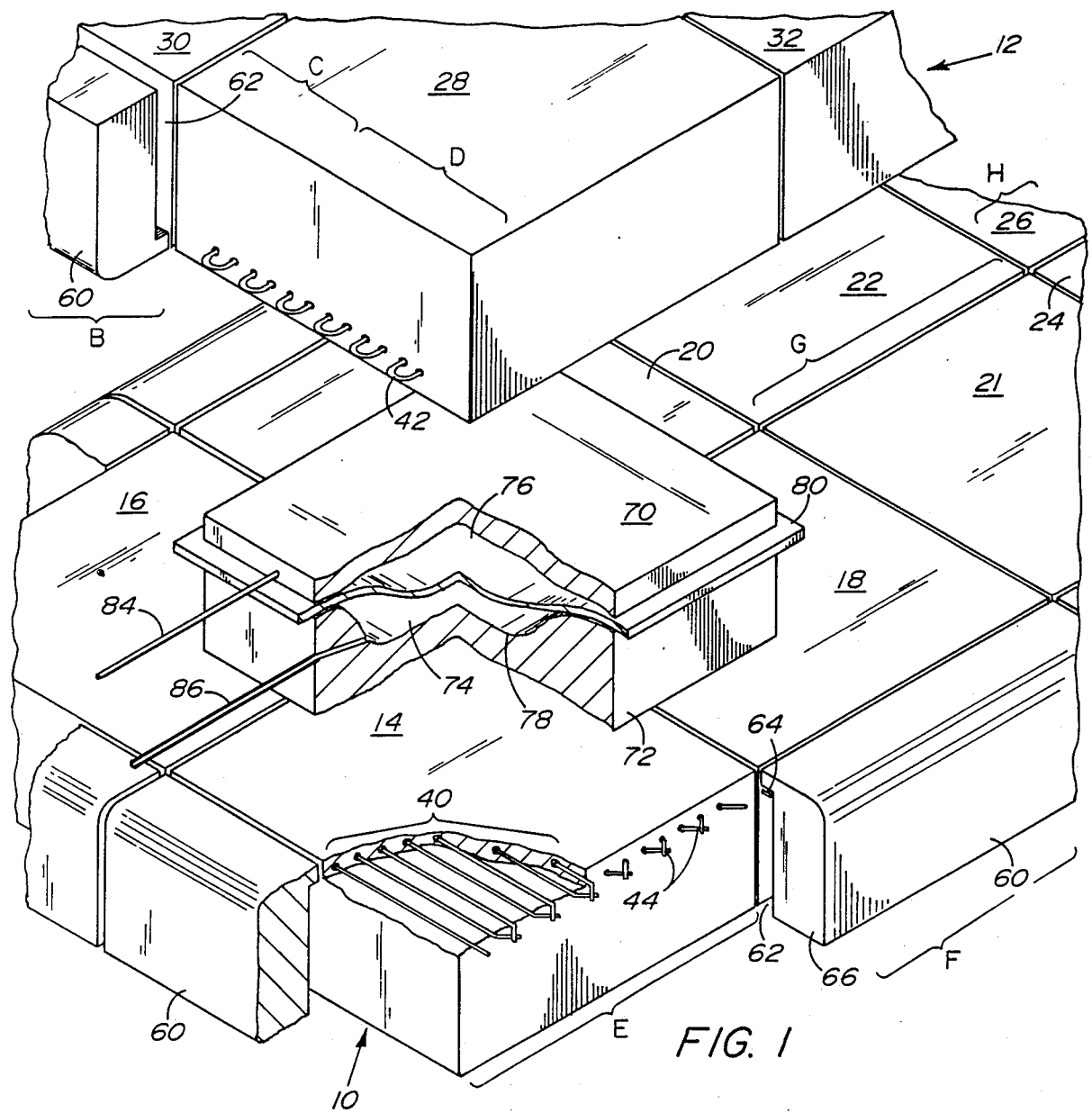
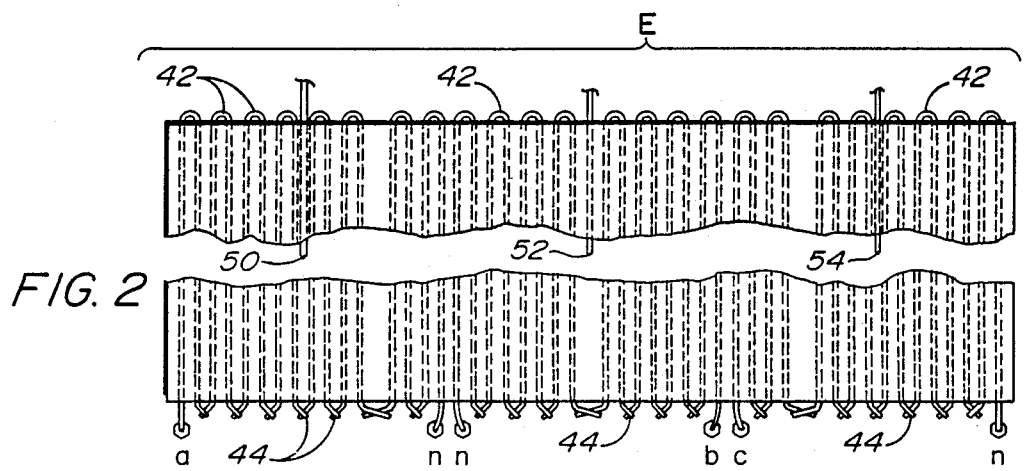

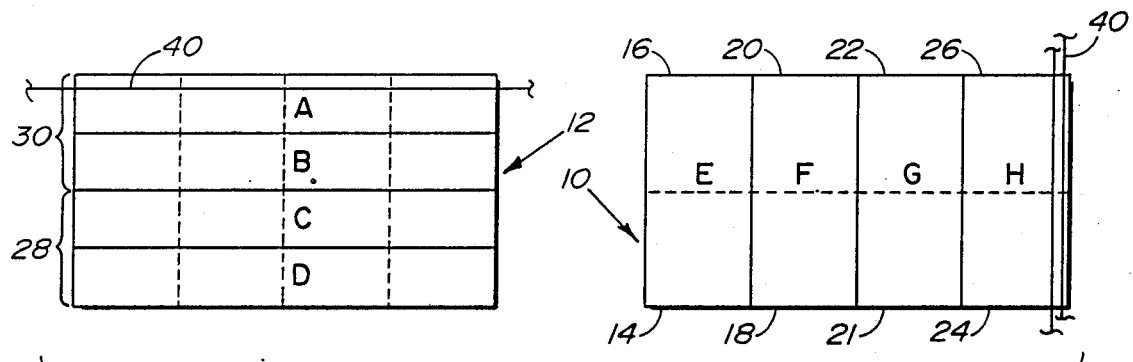
FIG. 5
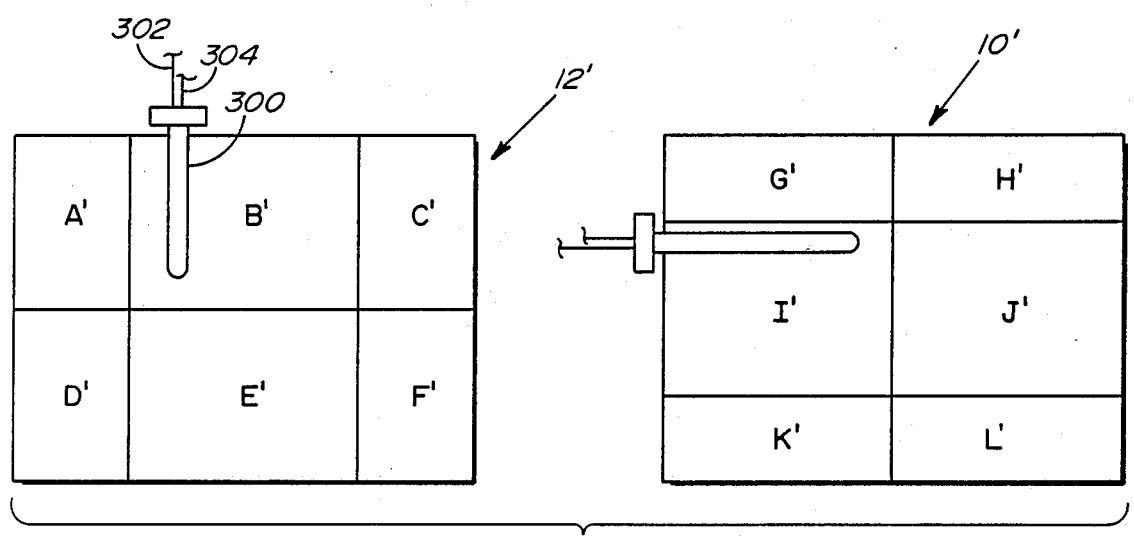
FIG. 6
| I | J | K | L |
| --- | --- | --- | --- |
| M | N | O | P |
| Q | R | S | T |
| U | V | W | X |
FIG. 7

HEATER FOR SUPERPLASTIC FORMING OF METALS

BACKGROUND OF THE INVENTION

FIELD OF THE INVENTION

The field of this invention lies within the field of superplastic forming of metals. Superplastic forming of metals is known in the art specifically for configuring metals which can be formed in their superplastic state, such as titanium, stainless steel, aluminum or other superplastic alloys and metals. This invention more specifically relates to the control of temperatures in a heated platen press. Such presses in particular are those which are used in a superplastic forming machine which includes a press, a mold and related support equipment, including the heaters.

DESCRIPTION OF THE PRIOR ART

Superplastic forming demands that a metal sheet of superplastic material, such as titanium, stainless steel, aluminum or other alloys, be heated to a specific temperature. After the sheet is heated to a specific temperature, it is then formed in a die. The die can be such wherein it is provided with a negative or positive pressure on one side of the sheet that varies as a differential from the opposite side of the sheet.

The sheet is brought to a specific temperature by preheating a die. The die is in a press and is heated to the correct forming temperature. After the forming temperature in the press is established, the sheet of metal is then placed over the die to allow it to be heated to the appropriate forming temperature.

Generally, the press incorporates platens with heaters therein to heat the material that is to be superplastically formed.

The respective forming temperature for each particular metal is critical. Only a small variation of temperature can be allowed across the face of the die. This is due to the fact that the metal must be worked in the optimum forming conditions with the optimum heating insofar as uniformity or specific areas of hot and low temperature with respect to each other must be maintained.

As a general rule, the heat losses from the press platens are not consistent. This is due to the fact that the platens are exposed at their edges and corners. Thus, the loss of heat at the edges and corners is greater than in the middle of the platens.

To accomplish the goal of providing uniformity of heat within the press platens, there are a multiplicity of heating zones in the platen. These zones are independently controlled and are set at different temperatures in order to maintain a constant temperature at the die.

In a typical superplastic forming machine, metal platens and multizone cartridge heaters are utilized. The multizone cartridge heaters are implaced in the platens. These multizone cartridge heaters have a plurality of separate heating elements along their length. In many cases, the heating elements can be three in number and are encapsulated within a heating element which provides for an internal insulation thereof. The insulation can be magnesium oxide or other oxide which separates the heating elements respectively from each other.

Another important consideration of a superplastic forming die is its geometry. Typically, a die is of a large area compared with its thickness. Any portion of the die can be affected both by the upper and lower platen zones that are in contact with the die.

Another consideration is that there is a trend away from metal platens to ceramic platens. This is based upon cost considerations as well as technical performance. For certain reasons, particularly with regard to engineering and manufacturing constraints, it is not possible to have multizone heaters in ceramic platens. This being the case, the invention hereof is extremely helpful in overcoming the deficiencies of the prior art.

In particular, the invention allows for multizone heating with inexpensively placed wires within a ceramic platen. The ceramic platens can incorporate a metal wire that is merely implaced therein in a simple and facile manner without any requirement of drilling, or incorporating a multizone enlarged heating element. Based thereon, multizone heating can take place as to a specific platen through the unique geometry and orientation of the heaters hereof. This is brought about by not only the geometry, but the different respective heating profiles of the respective platens which can be controlled by this invention.

Briefly stated, this invention provides for a superplastic forming heater or series of heaters for a superplastic forming machine that provides for uniformity of heating and compensation of heat loss in the respective areas such as the corners and edges which would otherwise be inadequately heated.

More particularly, the invention provides a pair of heated platens that between them provide a two dimensional multizone heating effect on a die placed between them.

The invention further has an object to provide two dimensional multizone heating in a ceramic platen. The platen can use bare wire heaters or single zone cartridge heaters without the cost, lack of flexibility and overall engineering problems associated with multizone cartridge heaters.

A further feature of this invention is the improvement in the platen heating control using bare wire heaters or single zone cartridge heaters.

An additional and important object of the invention is to provide a heated platen with a specific orientation. This orientation is with respect to the heating elements being established on the lower platen at an angular orientation to the direction of the heating elements on the upper platen. This angular orientation can be at roughly a 90° or geometrically normal crossing.

Depending upon the orientation, configuration and overall requirements of a mold or platen surface, this invention establishes an improvement over the state of the art as to both heating and maintenance of heat on a uniform basis in a simple and extraordinarily facile manner.

BRIEF DESCRIPTION OF THE DRAWINGS

The invention will be more clearly understood by reference to the description below taken in conjunction with the accompanying drawings wherein:

FIG. 1 shows a partially fragmented sectional view with portions broken away of an upper and lower platen of this invention incorporating a mold that is to be heated therebetween.

FIG. 2 shows a fragmented plan view of the heating elements of this invention with the respective terminals as oriented in a manner to provide the improvements hereof.

FIG. 5 shows the orientation and heating effect of the platens of this invention with respect to each other.

FIG. 6 shows an orientation of platens with a single zone cartridge heater.

FIG. 7 shows a plan view of the desired heating that is provided by this invention in the manner as established in the orientation of the heaters in FIGS. 5 and 6.

DESCRIPTION OF THE PREFERRED EMBODIMENTS

Figure 3:
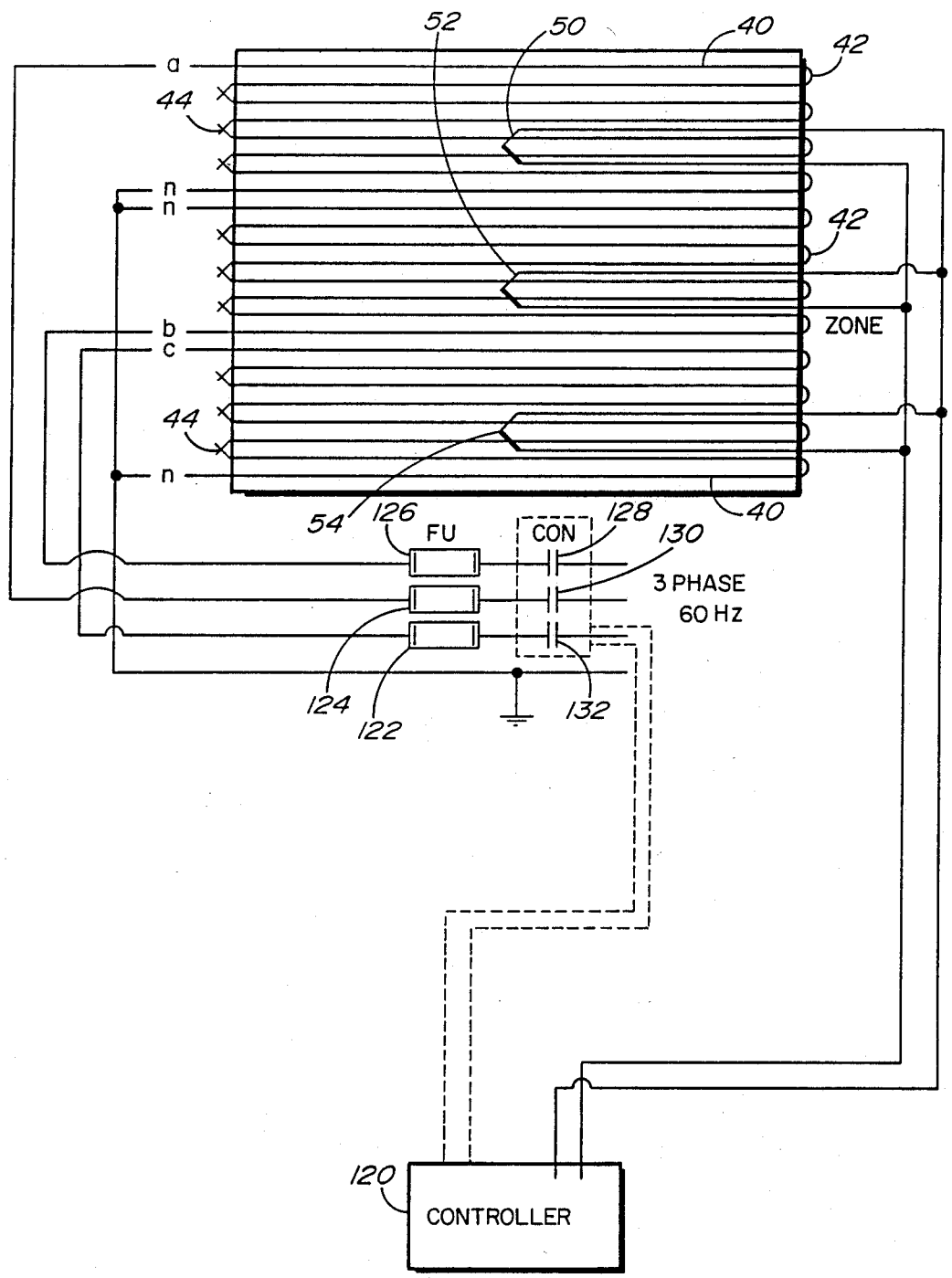
FIG. 3 shows a platen with the heating elements therein and three thermocouples and a controller for controlling one zone of a platen with the respective heating elements.

Looking more specifically at FIG. 1 and the other figures in conjunction therewith, it can be seen that a pair of platens are shown. The platens are heated platens with four zones of control. Depending upon the size of the platens and also on preference, any number of zones can be chosen.

The construction of ceramic platens with bare wire heaters is preferably wherein each heating zone should be the full length or width of the platen. However, other state of the art demands can create a platen having heating zones which are not the full length or width of the platen. This is usually based upon the situation wherein a single heater is utilized with a cartridge.

The specific embodiment as to the invention shown herein and in FIG. 1 is that of a bare wire heater.

In order to provide for the heating, a lower platen 10 is shown underlying the upper platen 12. The upper platen 12 and lower platen 10 comprise multiple platen segments. In this particular case, it can be seen that the lower platen comprises segments or portions 14 and 16 that are in side by side relationship. Additionally, lower segments or portions of the platen 18 and 20 as well as 21 and 22, and 24 and 26 are shown. The upper platen has segments or portions 28 and 30 that overlie segments 14 and 16.

The upper platen 12 also incorporates additional segments or portions such as segment 32 which overlies segment 18 of the lower platen 10. The remaining portions or segments of the upper platen 12 are analogously overlaid with respect to the lower platen segments 20, 21, 22, 24 and 26.

The lower platen 10 is schematically shown in FIG. 5 on the right side thereof, while the upper platen 12 is shown on the left side. The two respective platens 10 and 12 incorporate the orientation of the bare wire heaters as shown in the schematics. These traverse all the way through the ceramic platens in the manner to be described hereinafter.

Looking more specifically at FIGS. 1 and 5, the lower platen 10 can be seen wherein section or sector E incorporates segments 14 and 16 with a number of bare wires. The heating area or sector E of the lower platen incorporates segments 14 and 16. Heating area or sector F incorporates segments 18 and 20. Heating area or sector G incorporates segments 21 and 22. Heating area H incorporates segments 24 and 26.

The heating sector E incorporating segments 14 and 16 has a plurality of wires shown as wires 40. These wires 40 are shown as wires having a looped end 42 seen in FIG. 2 and a hairpin end 44. The hairpin end 44 is bent over and crimped to each other or welded.

The wires are initially implaced within the platens or segments 14 and 16 by casting the platens with a plastic coated aluminum rod or steel rod.

The plastic coated aluminum or steel rods are implaced within the ceramic. The plastic tends to bind on the ceramic when it is cast therein. Thereafter, the rods can be withdrawn through the plastic in which they have been coated. The plastic can be withdrawn after the metal rods have been withdrawn because of the fact that the plastic tends to shrink and can be pulled from the interior surface of the circular or open conduit which it has formed within the ceramic.

After the formation of the ceramic platen segments such as 14 and 16 forming sector E, the wires 40 are passed through the openings of the ceramic and then looped such as at ends 42 and then turned back and welded to form the hairpin overlayments 44.

In this manner, the wires can be looped, hairpin bent and welded to form continuous heater wires therein.

The platen segments 14 and 16 have continuous wires passing through them in this manner and looping backwardly in the manner set forth. In order to cause them to be heated, electrical current is delivered to each one. To do this, electrical current is connected to terminals a, b and c as shown. A neutral is shown in the form of neutrals n, with respect to each circuit, a, b and c.

Internally of the ceramic material are thermocouples. These thermocouples are standard thermocouples for providing an output dependent upon the heat and are then connected to the controller. In particular, thermocouples 50, 52 and 54 are shown. These thermocouples 50, 52 and 54 allow for the control in the manner set forth hereinafter.

The heating zone as indicated by the showing of FIG. 2, in its fragmented form comprises portions 14 and 16. These respective portions or segments allow for the heating in the manner set forth hereinafter in cooperation with the heating area zones or sectors A, B, C, D, E, F, G and H.

The upper platen with portions or segments 28 and 30, as well as the other portions overlying the respective portions of the lower platen, form heating zones or sectors A, B, C and D. Here again, looped wires looping at loops 42 and terminating at a bend in connected relationship have been welded at hairpin bends 44 provide for a heating element circuit in a continuum running through the blocks.

The wires 40 in FIG. 5 are shown as transversing through heating zones E, F, G and H by passing through the respective blocks such as blocks 28 and 30, and looping backwardly. Each one of the heating wires is arranged in the manner shown in FIG. 2.

In FIG. 5, the layout of the upper platen 12 is shown with zones A, B, C and D. The zones comprise wires running through half the width of the blocks, starting with block 28, 30, etc. overlying respectively segments or blocks 14, 18, 21 and 24. In like manner, zone B comprises half of the block 30 overlying segments or blocks 16, 20, 22 and 26. Each zone or sector of upper platen 12 is formed in half a width of block such that zone or sector D is formed in half of blocks 28, 30, etc. while zone C forms the other half.

Fundamentally, sectors or zones C and D comprise half blocks of those blocks starting at block 28 overlying segments of the lower platen 10, namely segments 14, 18, 21 and 24.

The upper platen and lower platen respectively 12 and 10 have a plurality of side blocks 60 shown in segmented form. The side blocks 60 have a kerf or undercut 62 forming an upper ledge portion 64 and a lower enlarged portion 66 in the manner of an inverted L. The kerf 62 receives the ends of the wires in the form of the loops 42 and the overlying hairpin welded segments 44. Also, the terminals a, b, c and the various neutral terminals n can pass upwardly therethrough and be connected as shown in the plan view of FIG. 2.

The side blocks 60, as well as the ceramic materials of the platen portions 14, 16, etc. are formed of alumina silica which is an insulating ceramic material. The entire side block 60 grouping holds together the orientation of the platen segments and blocks so that they can be held in a press.

In order to superplastically form a sheet of metal, a mold or form is shown within the press. The mold or form comprises an upper mold portion 70 and a lower mold portion 72. Between the two mold portions, a cavity 74 is shown. The cavity has an upper surface 76 and a lower surface 78. A sheet of metal 80 is maintained between the upper and lower surfaces, respectively 70 and 72. The sheet of metal 80 is to be formed and drawn against the mold surface 78.

In order to effectuate the foregoing, a negative differential pressure is provided by gas inlet pipes 84 and 86. Gas inlet pipes 84 and 86 can provide a nitrogen or argon atmosphere whereby a differential pressure is maintained between the upper and lower portions 70 and 72 of the mold. The superplastically formed metal sheet such as titanium, stainless, aluminum or other alloy, can be drawn down against the mold surface 78 by the negative pressure provided through the differential pressures of the two respective gas pipes 84 and 86.

Due to the construction of ceramic platens with bare wire heaters, each heating zone must be the full length or width of the platen. Thus, the lower platen 10 of FIGS. 1 and 5 shows an arrangement with the heaters arranged with the loops 42 and the welded bends 44 on either side and the heating elements traversing the short direction as shown by the heater wires 40 of lower platen 10 of FIG. 5. Conversely, the upper platen 12 of FIG. 5 shows the arrangement with the heaters arranged with their ends on the shorter side traversing the long direction. The net result is that the direction of the heating elements for the top and bottom platen are angular and preferably at right angles or normal to each other. It is not necessary that this geometric normality be maintained between the two respective platens, but only a geometrically angular orientation, depending upon the configuration and orientation of the respective platens and the overall forming that is to be undertaken.

The object of the upper and lower platen package is to provide constant temperature at the die or mold portion 70 and 72. This should be despite different heat losses from different parts of the platens 10 and 12.

A general showing of a series of temperature or heated zones of an upper or lower platen is shown generally in FIG. 7. The corner areas, namely corner area I, L, U and X, present the highest heat losses. This is due to the fact that the respective corners I, L, U and X have the largest edge regions exposed outwardly. The next highest heat losses are from the four side heated zones JK, MQ, PT and VW. The least losses are from the center thermal areas or zones N, O, R and S.

When the platens, namely lower platen 10 and upper platen 12, are emplaced over each other, the effect of the heating arrangement is such to provide uniformity. In particular sectors E and H of the lower platen 10 and sectors A and D of the upper platen 12 are set higher than the other sectors, namely that of F and G and B and C. the end result is an increased heating effect in the corners or thermal zones I, L, U and X. The next highest heating areas are along the edge regions, namely sectors JK, MQ, VW, and PT.

With the foregoing configuration, the corners are also increased in their heating capacity, namely corners I, L, U, and X.

It should be borne in mind that by heating the sectors A and D, they make up for the losses on the edge regions that are heated less by the lower platen in sectors F and G. By heating sectors E and H, they make up for the losses that are not provided in the side portions due to the lesser heating of sectors B and C.

The net result is to have a lower platen 10 and an upper platen 12 which make up for the losses of the respective areas so that a desired heating or thermal profile of the entire area of that shown in FIG. 7 can be effectuated to heat the corners and the sides in an appropriate manner.

Stated another way, the cumulative heating of sectors A and D of the upper platen 12, supplement the cumulative heating of sectors E and H of the lower platen 10 to heat up the corners I, L, U and X. The next portion of loss, namely, the intermediate side portions JK, MQ, PT and VW are supplemented by the upper platen sector portions A and D heating segments JK, and VW, while segments MQ and PT are heated at the edges by the lower platen 10 through its sectors E and H.

Looking more particularly at FIG. 3, it can be seen wherein the schematic layout of the platen has been shown. In particular, the loops 42 and crossover welded portions 44 have been shown, analogous to that in FIG. 2. The respective thermocouples, 50, 52 and 54 are shown in the respective electrical phases of the heater in order to control the three phase heating of the platen. Of course, this three zone heating can take place within the sectors A through H. This allows for the control selectively of a respective zone or sector A through H to provide the sector heating, as previously set forth. The purpose of the three thermocouples is to average the temperature of the three phases, and is designed to protect the elements and the press platen in the event of any one phase being disabled.

The control of the heating zones is through the electrical control provided by a controller 120. Each thermocouple 50, 52 and 54 are connected to the controller.

The terminals are connected to a source of power from a three phase 60 hertz power supply as shown. This source of power is isolated by fuses 122, 124 and 126 on each line.

The three phase 60 hertz power is delivered through contactors 128, 130 and 132 that are opened and closed by the controller. The lines from the controller 120 open and close the contactors depending upon the respective setting that is desired and is sensed at the thermocouples, 50, 52 and 54.

Figure 4:
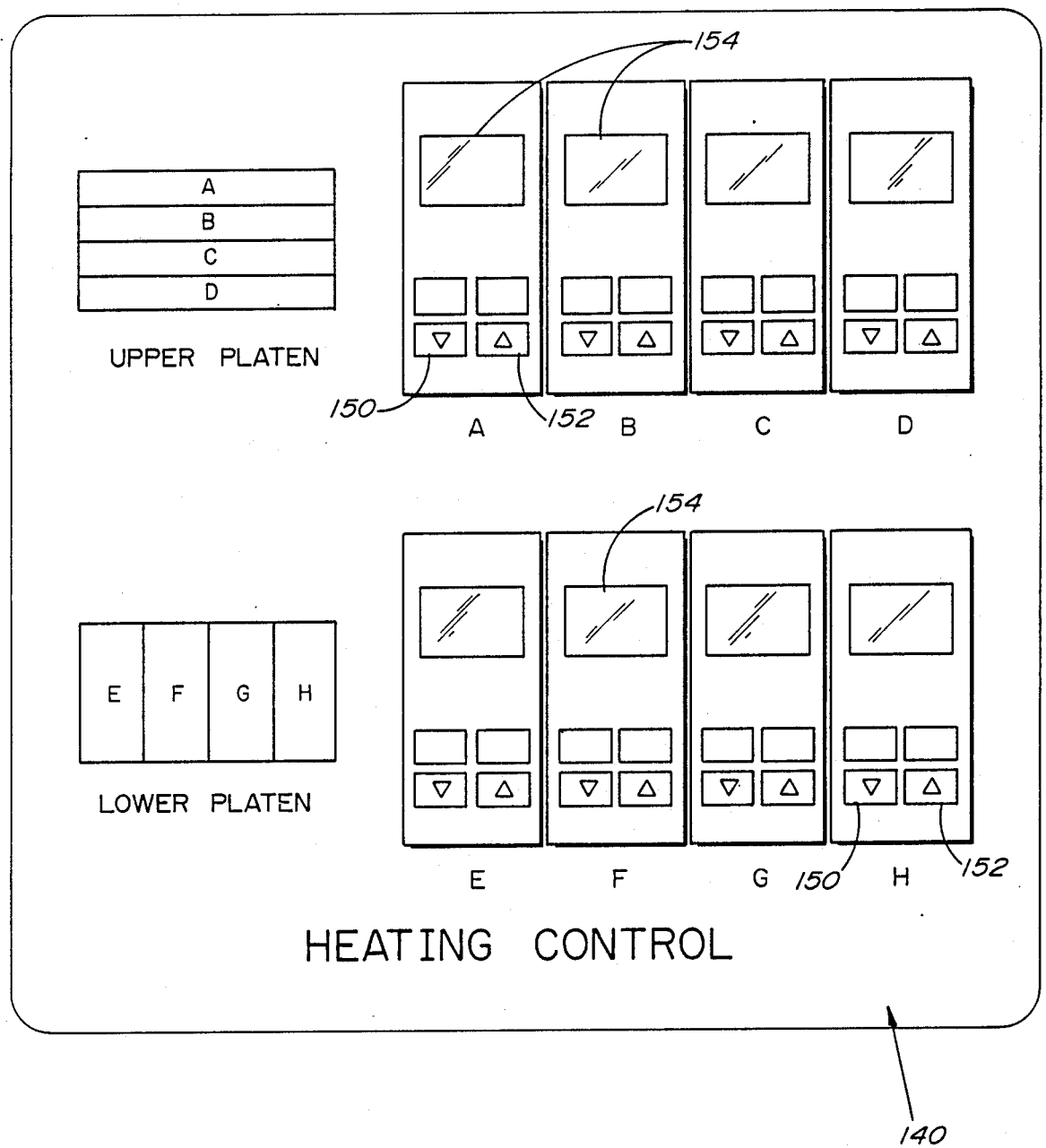
FIG. 4 shows the heating control system wherein the upper and lower platens specifically are oriented for their control and indexing by means of their controllers shown on the panel face.

Looking more particularly at FIG. 4 it can be seen where a heating control panel 140 is shown. The heating control panel 140 incorporates controls for the upper platen and switches for sectors A, B, C and D.

The lower platen is shown with sectors E, F. G and H. These again are shown as being provided with analogous switches E, F, G and H.

The upper platen controls and lower platen controls are shown for orientation and an appropriate increase and decrease switch such as controls for Sector A are shown as decrease switch 150 and increase switch 152. A readout of the temperature can be seen on a digital readout 154. This corresponds throughout the sector controls A, B, C, D, E, F, G and H, so that an increased or decreased control can take place, depending upon the temperature read in the windows 154 and an appropriate increase or decrease through switches 150 and 152 can take place. Thus, depending upon the sensing of the thermocouples, 50, 52 and 54, the increase or decrease of a sector can be enhanced by merely reading the temperature at windows 154 and then controlling it by an up or down mode respectively by switches 150 and 152.

An alternative showing of heating has been shown in FIG. 6 wherein alternative upper and lower platens 12' and 10' have been shown. These heaters utilize what are known as single zone cartridge heaters.

The single zone heaters of this invention, as can be seen, can be spaced in the sectors A' to L' of the respective upper and lower platens. In this manner, the sectors A' through L' can be properly heated to effectuate any degree of geometric relationship to enhance the heating of the corners and the edge regions as shown in relationship of FIG. 5 as it relates to FIG. 7.

This invention should not be limited to any type of wire heater or zone heater, but rather the geometrical orientation of limiting the escape of heat in platen heat maintenance and as will be seen in the claims hereinafter, specifically also with regard to superplastic forming of metals.

I claim:

1. A superplastic forming machine comprising a press with platens in the press in overlying relationship and a mold for superplastic forming therein wherein the platens comprise:
    a first platen made of ceramic material having a first plurality of heater wires passing through said ceramic material connected to a source of electrical energy for heating said wires wherein said wires pass predominantly in number in a given direction through the first platen; and,
    a second platen formed of ceramic material having a second plurality of heater wires passing therethrough which are connected to a source of electrical energy for heating said second platen wherein said second plurality of wires in said second platen are at a substantially right angle relationship to the wires of said first platen so as to heat areas at two opposite edge regions of each platen with wires extending along the side portions thereby heating the opposed side portions in a variable manner with respect to each platen.

2. The superplastic forming machine as claimed in claim 1 wherein:
    said platens are formed of a ceramic material firstly having a bore therein which then receives a heater wire passing through said bore.

3. The superplastic forming machine as claimed in claim 2 wherein:
    said bore has been formed by casting wires that are plastic coated within said ceramic after which said wires and said plastic coating on said wires are removed.

4. The superplastic forming machine as claimed in claim 1 wherein:
    each of said platens comprises a plurality of heated sections and each of said heated sections is separately controlled.

5. The superplastic forming machine as claimed in claim 4 wherein:
    said platens are formed in a generally rectangular shape one over the other.

6. The superplastic forming machine as claimed in claim 5 wherein:
    said first platen has heated sections with heater wires in one direction thereof; and,
    said second platen has heated sections with heater wires substantially at ninety degrees from said first platen and is such wherein the heated sections overlie each other.

7. The superplastic forming machine as claimed in claim 6 wherein:
    said platens are formed such that the sections can respectively heat the outer corners at the highest temperature with the periphery between the corners being heated at the second highest temperature and the interior being heated at a lower temperature from the foregoing two peripheral areas.

8. The superplastic forming machine as claimed in claim 7 wherein:
    said heating sections are segmented in the form of plural blocks of ceramic material and wherein said plural blocks of ceramic material are held in place by edge blocks.

9. The superplastic forming machine as claimed in claim 8 wherein:
    the ends of said heater wires passing from said ceramic blocks pass externally thereof; and,
    wherein said edge blocks are provided with an opening to receive the terminal ends of said heater wires.

10. A superplastic forming machine for superplastic formation of sheets of superplastic formable metal comprising:
    a first ceramic platen adapted to be held within a press;
    a second ceramic platen overlying said first platen adapted to be held within a press;
    a mold;
    means to maintain a sheet of metal within said mold;
    means for providing a negative pressure at one of the surfaces of said metal;
    heater wires extending through said respective first and second platens wherein said heater wires in one of said platens are at substantially a right angle to the heater wires of the other of said platens to form variably heated sections along the overlying edge regions of each respective platen with respect to the other; and,
    means for individually controlling the temperature of the sections of said platens so that said wires crossing each respective section can provide heat which is controlled for each section at a respectively desired temperature.

11. The superplastic forming machine as claimed in claim 10 further comprising:
    a plurality of thermocouples within said platens to sense temperatures in the different sections.

12. The superplastic forming machine as claimed in claim 11 wherein:
    said platens are rectangularly shaped.

13. The superplastic forming machine as claimed in claim 12 further comprising:

a plurality of sections in said rectangular platens that have been segmented in opposed relationship with respect to each respective platen and which can be controlled to maintain the area between said platens at a hotter temperature at the corners than the peripheral areas between the platens and the interior area between said platens.

14. A superplastic forming machine for forming a superplastically formable metal sheet within a mold or die by means of a pressure differential wherein the improvement comprises:
   a first ceramic platen formed in rectangular sections of the first platen having heater wires extending from one side of each section to the other side which can be controlled as to each section with respect to another section independently as to heating; and,
   a second series of sections in a second platen formed of ceramic sections having heater wires in substantially right angular relationship to said first platen heater wires and wherein said second sections can be controlled independently whereby zones of heating can be increased at the corners with respect to the other sections.

15. The superplastic forming machine as claimed in claim 14 wherein:
   said heater wires extending through said sections are in connected relationship to each other; and,
   wherein the temperature of said sections are sensed by thermocouples in each respective section connected to a controller which in turn controls the amount of electrical energy to said heater wires.

16. The superplastic forming machine as claimed in claim 14 wherein:
   said rectangular sections are in respective overlying and underlying relationship such that one group of sections are of a greater elongated shape as to respective relative dimensions than the second of such sections.

17. The superplastic forming machine as claimed in claim 16 further comprising:
   looped wires forming said heater elements which pass through said platens having openings therein formed by casting ceramic material over plastic coated wire forms which are withdrawn to provide the openings after formation for said wires passing therethrough and wherein said wires are looped at one end and welded at the other end to provide a continuous loop of wires in said sections and wherein said sections are controlled by said thermocouples connected to a controller for changing the relative amount of electrical energy to said wires.

* * * * *